United States Patent
Zhang et al.

(10) Patent No.: US 7,319,873 B2
(45) Date of Patent: Jan. 15, 2008

(54) GATEWAY HOME LOCATION REGISTER AND METHOD OF EXCHANGING SUBSCRIBER ROUTING INFORMATION USING THE SAME

(75) Inventors: Wenlin Zhang, Shenzhen (CN); Lixin Sun, Shenzhen (CN); Shaobo Zhang, Shenzhen (CN); Weijie Wang, Shenzhen (CN); Hao Ding, Shenzhen (CN)

(73) Assignee: Huawei Technologies Co., Ltd., Shenzhen, Guangdong Province (CN)

( * ) Notice: Subject to any disclaimer, the term of this patent is extended or adjusted under 35 U.S.C. 154(b) by 0 days.

(21) Appl. No.: 10/527,654

(22) PCT Filed: Sep. 12, 2003

(86) PCT No.: PCT/CN03/00770
§ 371 (c)(1),
(2), (4) Date: Mar. 14, 2005

(87) PCT Pub. No.: WO2004/025981
PCT Pub. Date: Mar. 25, 2004

(65) Prior Publication Data
US 2006/0030328 A1 Feb. 9, 2006

(30) Foreign Application Priority Data
Sep. 13, 2002 (CN) ............................ 02 1 30652

(51) Int. Cl.
*H04Q 7/20* (2006.01)

(52) U.S. Cl. .................................... 455/445

(58) Field of Classification Search ............ 455/445, 455/403
See application file for complete search history.

(56) References Cited

U.S. PATENT DOCUMENTS

2006/0030328 A1* 2/2006 Zhang et al. ............... 455/445

FOREIGN PATENT DOCUMENTS

| CA | 2281041 | 8/1999 |
|---|---|---|
| WO | 98/11751 | 3/1998 |
| WO | WO 98/39944 A | 9/1998 |
| WO | 99/16272 | 4/1999 |
| WO | WO 99/21386 A | 4/1999 |

OTHER PUBLICATIONS

European Search Report from corresponding European Application No. 03794760, Sep. 13, 2002.
Digital Cellular Telecommunications System (Phase 2+); Support of Optimal Routeing (SOR); Technical realisation (GSM 03.79 Version 7.3.0 release 1998) ETSI TS 101 045 V7.3.0, Jun. 1, 2000, pp. 1-41, XP002382371.

* cited by examiner

*Primary Examiner*—William D. Cumming
(74) *Attorney, Agent, or Firm*—Wolf, Greenfield & Sacks, P.C.

(57) ABSTRACT

A Gateway Home Location Register (GHLR) includes a signaling transceiving module, a security rule configuration module, and a routing information security analysis module. A method of exchanging roaming subscriber routing information includes the following steps: the GHLR in the home network receives an information request and determines the request according to the security rules in GHLR; if the request is according to the security rules in GHLR, GHLR sends called information to the network element capable of fetching subscriber routing information in the visited network. Through introducing a roaming subscriber information security control method and a device GHLR, this invention can solve the problem of exchanging roaming subscriber information between networks, support the visited network to provide service for the roaming subscribers in it, and protect security of the home operator and subscriber information.

13 Claims, 7 Drawing Sheets

Signaling from other network elements

GATEWAY HOME LOCATION REGISTER AND METHOD OF EXCHANGING SUBSCRIBER ROUTING INFORMATION USING THE SAME

FIELD OF THE INVENTION

The present invention relates to mobile communication technology, particularly to routing information optimization and control technology in mobile communication field.

BACKGROUND OF THE INVENTION

In the existing routing solution for mobile communication networks, to support calling of a mobile phone subscriber in roaming state, a voice bear has to be established between the mobile network in the subscriber's home region and the mobile network in the roaming region. Due to the long communication route, the voice quality of roaming service is degraded, and more network resources are consumed; furthermore, the communication cost in roaming state is much higher than that in normal state. Especially, when a subscriber is in international roaming state, all calls to the subscriber are international long-distance calls, i.e., the calls have to be accomplished through a voice bear between the mobile network in the home country and the mobile network in the roaming country, and the roaming subscriber has to pay the charge for international long-distance calls between the home country and the roaming country, even though the calling party is within a stone's throw to the roaming subscriber. For example, when companions in the same tourist party as the roaming subscribers call each other, or a fixed phone subscriber or a mobile subscriber in the roaming region calls the roaming subscriber, a voice bear has to be established in the roaming mode as described above, even though the calling party is very close to the roaming subscriber; in addition, since the voice bear is routed to the roaming subscriber's home country and then detoured, the long-distance international connection results in poor voice quality, and the subscriber has to pay double international long-distance call cost; as shown in FIG. 1, the procedure is as follows:

1. Subscriber B roams in the serving area of Visit Location Register (VLR) B in Public Land Mobile Network (PLMN) A; subscriber A in PLMNA calls subscriber B; the call is switched to the Gateway Mobile-Services Switching Center (GMSC) A;
2. GMSCA routes the call to GMSCB in PLMNB;
3. GMSCB sends a "Send Routing Information" (SRI) message to request for routing information to Home Location Register (HLR) B;
4. HLRB requests for the roaming number to VLRB;
5. VLRB sends a roaming number to HLRB;
6. HLRB returns the roaming number to GMSCB;
7. GMSCB routes the call to GMSCA by determining the roaming number is a number in the country where PLMNA is;
8. GMSCA switches the call to MSCB according to the roaming number. For this problem, a method of support of optimal route (SOR) in the technical specifications of Global System for Mobile Communications (GSM) and Universal Mobile Telecommunication Services (UMTS) proposes that the GMSCA fetches the routing information directly from HLRB, but the method is substantially inapplicable at present in view that the operators tend to protect their subscribers' information. According to the current specifications, the roaming number should generally be obtained from the home network if the route optimization is required; however, the issue of subscriber routing information protection involved in international roaming has not been settled; therefore, route optimization service can't currently be developed and applied on a large scale.

SUMMARY OF THE INVENTION

In view of above situation, the present invention provides a GHLR and a method of exchanging roaming subscriber routing information using the same.

A Gateway Home Location Register (GHLR), comprising:

a signaling transceiving module, connected to a subscriber routing information storage network element in a home network and a network element capable of fetching subscriber routing information in a visited network, and designed to receive a signaling request and return an acknowledgement, so as to accomplish information exchange between the network element and the GHLR;

a security rule configuration module, designed to store intercommunication security rules and relevant data of the GHLR system;

a routing information security analysis module, designed to receive and store signaling information sent from the signaling transceiving module, to identify and analyze the signaling request according to security rules generated by the security rule configuration module, and to return the acknowledgement to a destination network element via the signaling transceiving module.

Said intercommunication security rules include security rules configured by the operator and security rules selected by subscription of the subscriber.

Said security rule configuration module comprises:

a security rule storage module, designed to store the logics of intercommunication security rules of the GHLR system;

a system intercommunication security rule storage module, designed to store the intercommunication security rule data of the GHLR system;

a subscriber subscription intercommunication data storage module, designed to store subscriber subscription intercommunication data;

a subscriber subscription data conversion module, designed to map subscriber data to the intercommunication security rule data of the system and determining whether the subscriber subscription data is valid according to the intercommunication security rule data of the system.

Said GHLR also comprises an input means connected with the security rule storage module and the subscriber subscription intercommunication data storage module, so as to accomplish data input and update.

Said security rules selected by subscription of the subscriber include at least one of serving area restriction, trans-area service restriction and intercommunication information content restriction, or combinations of them.

Said security rules configured by the operator include at least one of whether the called subscriber is a subscription one, whether the calling network element is a legal network element, whether the signaling element is valid, whether the value of the signaling element is valid and whether the service area is valid, or combinations of them.

Said network element capable of fetching subscriber routing information is a MSC.

Said network element capable of fetching subscriber routing information is a Service Control Point (SCP).

In said GHLR, the interface signaling protocol between the signaling transceiving module and the subscriber routing information storage network element either may be the same as or may be different from that between the signaling transceiving module and the network element capable of fetching subscriber information.

A method of exchanging roaming subscriber routing information, comprising the following steps:

a. the network element capable of fetching subscriber routing information in the visited network sending a routing information request signaling to the GHLR in the home network;

b. the GHLR receiving the information request and determining the request according to the security rules of the GHLR; if the request is accordant to the intercommunication security rules of the GHLR, going to step c; otherwise the GHLR rejecting the information request;

c. the GHLR interacting with the HLR in the home network to obtain routing information;

d. the GHLR determining the received routing information according to the intercommunication security rules; if the routing information is accordant to the intercommunication security rules, going to step e; otherwise the GHLR rejecting the request;

e. sending the routing information to the network element that sending the request in the visited network.

Said step b further comprises:

b11. the signaling transceiving module of the GHLR in the home network, after receiving the routing information request signaling from the visited network, invoking the system intercommunication security rule storage module configured by the operator, and determining whether the request is accordant to the security rules configured by the operator; if so, going to step b12; otherwise rejecting the request;

b12. invoking the subscriber intercommunication data storage module configured by the subscriber, and determining whether the request is accordant to the security rules configured by the subscriber; if so, going to step c; otherwise rejecting the request.

Said step b further comprises:

b21. the signaling transceiving module of the GHLR in the home network, after receiving the routing information request signaling from the visited network, invoking the subscriber intercommunication data storage module configured by the subscriber, and determining whether the request is accordant to the security rules configured by the subscriber; if so, going to step b22; otherwise the GHLR rejecting the request;

b22. invoking the system intercommunication security rule storage module configured by the operator, and determining whether the request is accordant to the security rules configured by the operator; if so, going to step c; otherwise the GHLR rejecting the request.

Through introducing a roaming subscriber information security control device (i.e., GHLR) into the traditional mobile communication system and a method of exchanging roaming subscriber information using the GHLR, the present invention can settle the problem of exchanging roaming subscriber information between networks, and thus enabling the visited network to provide services for roaming subscribers conveniently and protecting security of the home network operator and roaming subscriber information.

DETAILED DESCRIPTION OF THE EMBODIMENTS

The embodiments of the present invention will be described with reference to the attached drawings.

Figure 1:
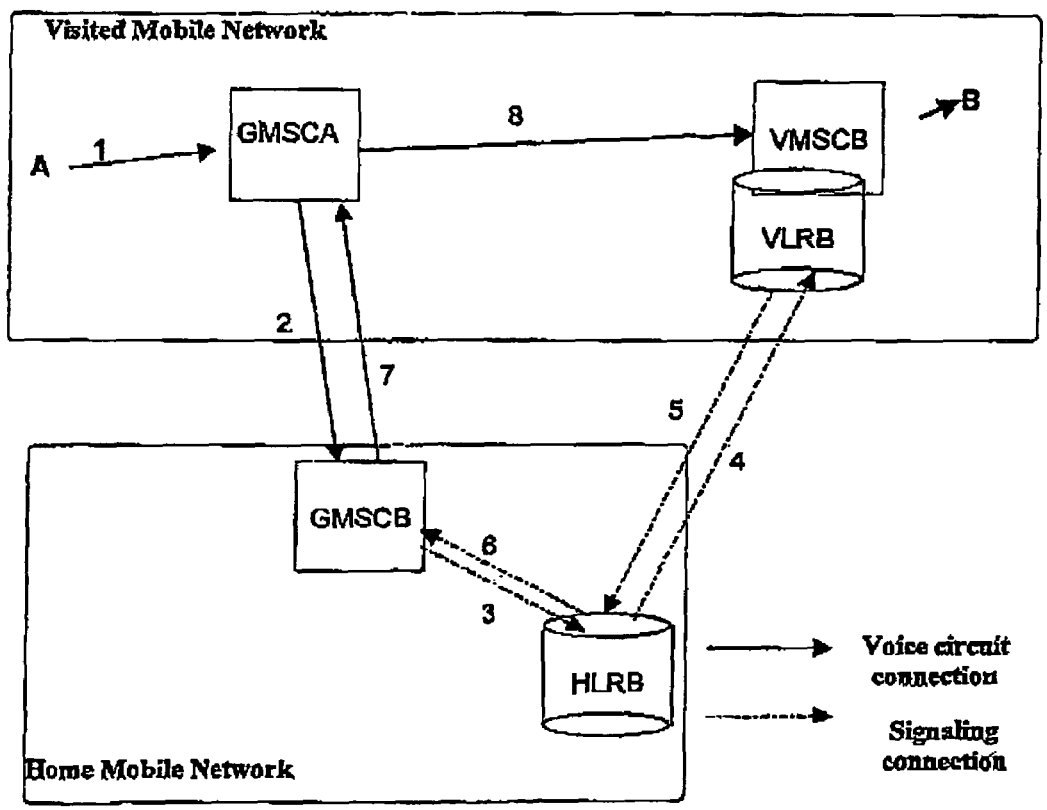
FIG. 1 is a schematic diagram of calling switching in roaming subscriber communication services with the prior art.
Figure 2:
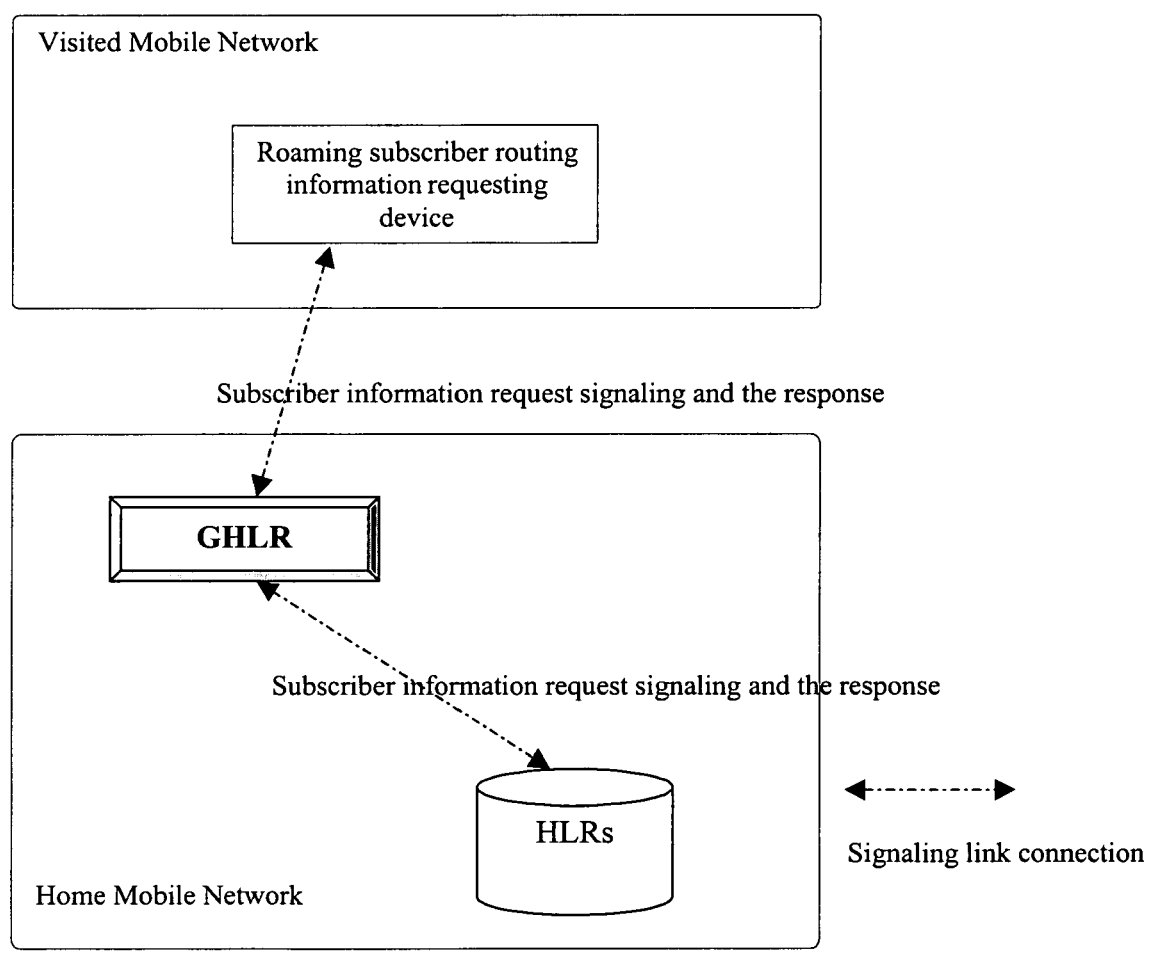
FIG. 2 is a schematic diagram of the network connections of a GHLR in an embodiment of the present invention.

FIG. 2 is a schematic diagram of the connections of the GHLR of the present invention. As shown in FIG. 2, the GHLR of the present invention is connected to a subscriber routing information storage network element in the home network and a network element capable of fetching subscriber routing information in the visited network.

Figure 3:
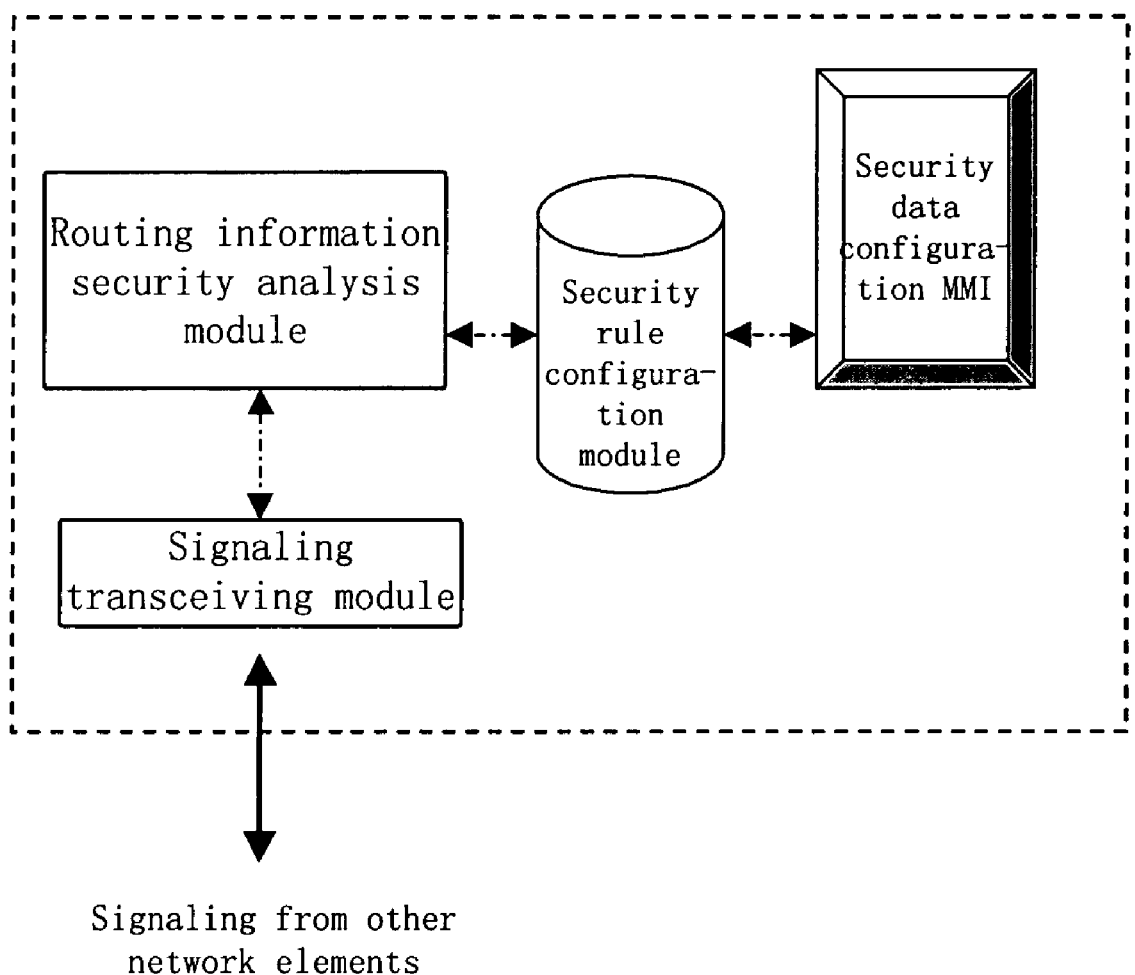
FIG. 3 is a structurally schematic diagram of the internal functional modules in a GHLR.

As shown in FIG. 3, the GHLR of the present invention may be either an independent device or a subscriber information security control device added with a GHLR; its necessary structural modules are as follows:

a signaling transceiving module, which is connected to a subscriber routing information storage network element in the home network and a network element capable of fetching subscriber routing information in the visited network, and is designed to receive and transmit interface signaling containing subscriber information between network elements in the mobile communication network, such as Signaling System Number 7 (MAP and CAP, etc.) in the GSM network; through data configuration, said module can interact with a specified mobile network element, such as Mobile-services Switching Center (MSC), Home Location Register (HLR), etc., so as to accomplish information exchange between the network element and the GHLR; said network element capable of fetching subscriber routing information in the visited network may be a MSC or a SCP in an intelligent network. During the interaction, the signalling protocol used at one side of the GHLR may be different from that used at the other side of the GHLR; for example, the subscriber information request signalling may be one type of signalling protocol; whereas the interaction between the GHLR and the subscriber routing information storage network element may be another type of signalling protocol. According to the configuration, the signaling transceiving module transmits and receives signaling with different signaling under different protocols, analyzes the information in the received signaling, sends the result to the information security analysis module, and sends the signaling to the external network element, according to an appropriate signaling protocol, as instructed by the information security analysis module.

a security rule configuration module, which stores system security rules and relevant data;

a routing information security analysis module, which receives and stores the signaling from the signaling transceiving module, identifies and analyzes the signaling request according to the security rules stored in the security rule configuration module, and returns an acknowledgement to the destination network element.

Figure 4:
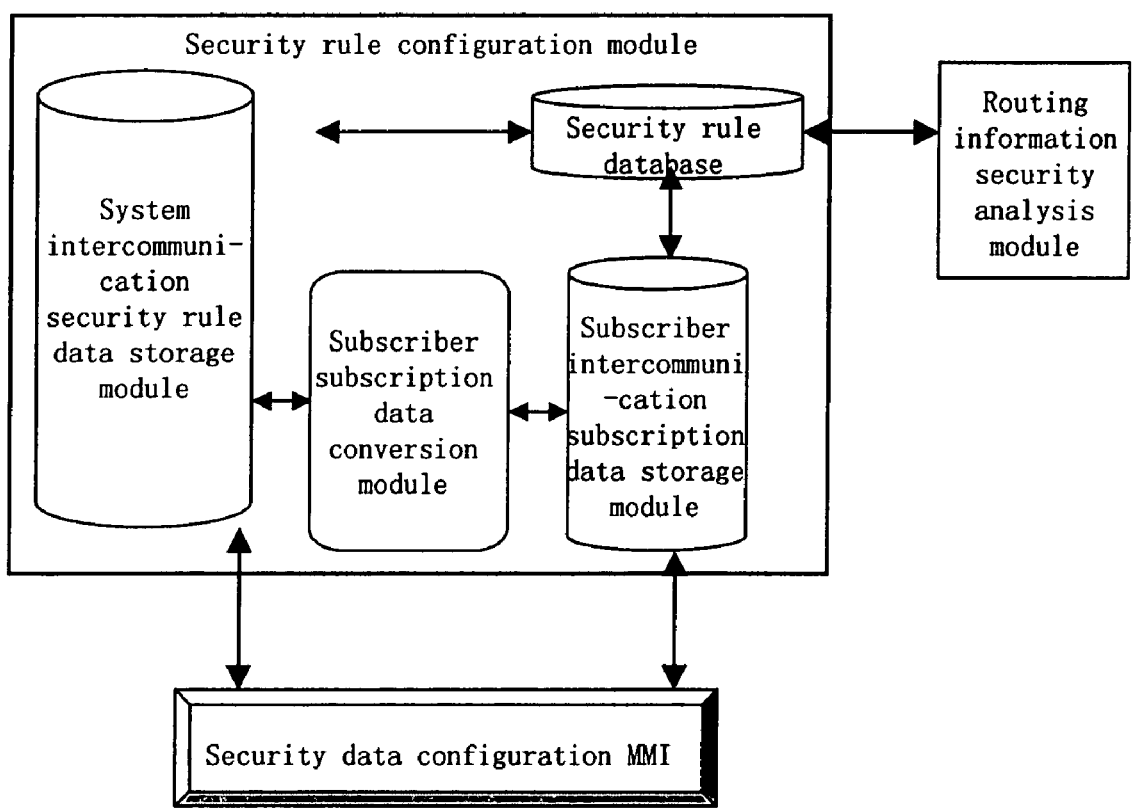
FIG. 4 is a structurally schematic diagram of the security rule configuration module in the GHLR.

As shown in FIG. 4, said security rule configuration module may also comprise:

a security rule storage module, designed to store the logics of intercommunication security rules of the GHLR system;

a system intercommunication security rule storage module, designed to store the intercommunication security rule data of the GHLR system;

a subscriber subscription intercommunication data storage module, designed to store subscriber subscription intercommunication data;

a subscriber subscription data conversion module, designed to map subscriber data to the intercommunication security rule data of the system and determining whether the subscriber subscription data is valid according to the intercommunication security rule data of the system.

Said GHLR is also provided with an input means connected with the security rule configuration module. Said GHLR is connected between the system intercommunication security rule storage module, and the subscriber subscription intercommunication data storage module (i.e., said GHLR is a Man-Machine Interface), and designed to accomplish data update.

The system security rules described above include security rules configured by the operator and security rules configured by the subscriber; wherein the security rules configured by the operator, for example, may include:

Service subscription information of the called subscriber (including inquiry of subscription data and validity period);

Whether the calling network element is a valid one (determine according to the data configured by the subscriber if the subscriber subscription coverage is available; otherwise determine according to the data configured by the system);

Whether the signaling from the calling network element is valid (some signaling such as Anytime Information (ATI) may be blocked according to the security requirement);

Whether the information elements in the signaling are valid, and whether the values of the information elements are valid (some information elements may be blocked according to the security requirement, for instance, information elements related with closed user group, location information, called IMSI, etc.);

Whether the service area is valid (whether the region where the calling subscriber and the called subscriber or beyond the valid service area).

The subscriber subscription intercommunication security data may comprise:

List of service area restriction: the subscriber may select the list of route optimization service area (country, region or network service area, etc.); the mapping relation between the service regions and the network elements is defined and configured by the operator. For example, when the subscriber selects "the United Kingdom", the operator will set the legal exchanges corresponding to "the United Kingdom". The operator may grant route optimization only in several service areas, wherein a service area may be a country/region, or combination of several countries/regions (for instance, Europe or Western Europe), or combination of several countries/regions that have no relation with each other geographically.

List of trans-area services: the subscriber may select countries/regions that support trans-area call (e.g., the United Kingdom-France), indicating that route optimization shall be carried out for the calls initiated in the United Kingdom when the subscriber roams in France. Some trans-area calls may be forbidden; for instance, though the legal region is chosen as "Europe", the subscriber may choose to forbid trans-area calls from "Switzerland to the United Kingdom" if the charge for international long distance calls from Switzerland to the United Kingdom is more expansive than that for the calls from Switzerland to home country and then to the United Kingdom.

List of intercommunication information content restriction (listing the permitted intercommunication information content scope; for instance, only the roaming number in the routing information is permitted, but other data such as forwarding number etc. is forbidden, and the data corresponds to special information elements of the signaling).

Wherein, the determination rules may include part or all of the following elements:

(1) a called subscriber identifier, which indicates whether the called subscriber has subscribed the service;

(2) a valid period of service, which indicates the valid period of the subscribed service;

(3) a list of calling network elements, which indicates whether the listed network elements are subscribed legal network elements;

(4) a list of signaling, which indicates legal signaling (for example, only SRI signaling may be permitted; other signaling, such as ATI, will be rejected by the GHLR as it is considered as illegal signaling);

(5) a list of information elements, which indicates legal information elements permitted, and is used to determine whether the information elements (e.g., subscription information, VMSC address, and forwarding data, etc.) contained in the signaling are permitted by the rules;

(6) a list of values of information elements, which lists legal values of the information elements. (For instance, if, according to the roaming number, GHLR determines the called roaming subscriber is not in the OR service area where the calling subscriber is, it may inform the calling subscriber by voice: the service is unavailable because the called subscriber is not in the service area, please dial directly. A simple example is the case that the called subscriber is not in the country where the calling subscriber is; in this case, GHLR, after fetching the routing information, determines the MSRN is not a number in the visited country of the roaming subscriber or a number in the country which the roaming subscriber has subscribed, GHLR will reject to return the information.)

The determination rules may also include other elements that are considered to be necessary by the operator.

These elements and combinations of them constitute the basis of setting down corresponding security rules. During operation, GHLR will determine whether the information is legal according to the values of the elements corresponding to the security rules.

In practical application, a PLMN may employ one or more GHLRs to process roaming subscriber information request signaling from other networks; those GHLRs have signaling connections with the internal network and other networks.

The method of fetching roaming subscriber routing information using the GHLR of the present invention may comprise the following steps:

a. the network element capable of fetching subscriber routing information in the visited network sending a routing information request signaling to the GHLR in the home network;

b. the GHLR receiving the information request and determining the request according to the security rules of the GHLR; if the request is accordant to the intercommunication security rules of the GHLR, going to step c; otherwise the GHLR rejecting the information request;

c. the GHLR interacting with the HLR in the home network to obtain routing information;

d. the GHLR determining the received routing information according to the intercommunication security rules; if the routing information is accordant to the intercommunication security rules, going to step e; otherwise the GHLR rejecting the request;

e. sending the routing information to the network element that sending the request in the visited network.

Said step b further comprises:

b11. the signaling transceiving module of the GHLR in the home network, after receiving the routing information request signaling from the visited network, invoking the system intercommunication security rule storage module configured by the operator, and determining whether the request is accordant to the security rules configured by the operator; if so, going to step b12; otherwise the GHLR rejecting the request;

b12. invoking the subscriber subscription intercommunication data storage module configured by the subscriber, and determining whether the request is accordant to the security rules configured by the subscriber; if so, going to step c; otherwise the GHLR rejecting the request.

Actually, the precedence order of above steps b1 and b2 may be reversed, which will not affect the obtaining of the routing information. For the roaming subscriber information security control device, the precedent relation of inquiry in the security rule storage module configured by the operator and the security rule storage module configured by the subscriber is not absolute; for example, the inquiry may be performed in the security rule storage module configured by the subscriber first and then in the security rule storage module configured by the operator, which virtually has no impact on realizing the object of the present invention.

The determination content in step d is different from that in step b: step b involves determining whether the request meets the criteria and can be accepted according to the security rules; whereas step d involves determining whether the fetched routing information meets the criteria and can be sent to the requesting party; for example, when the requesting party is in region A but the fetched routing information indicates a route to region B, the request will be rejected in step d if the requesting party or the operator has instructed in the rules to reject such a route.

Hereunder a particular example is shown:

Suppose a subscriber B roams into region A and demands communication service, and we define as follows:

| | |
|---|---|
| PLMNA | Public Land Mobile Network in the visited region where the called subscriber B is roaming; |
| PLMNB | Public Land Mobile Network in the home region where the called subscriber B is; |
| GMSCA | Gateway Mobile-Service Switching Center that provides services for the calling subscriber A; |
| VMSCB | Visit Mobile-Service Switching Center that provides services for the called subscriber B; |
| VLRB | Visit Location Register that provides services for the called subscriber B; |
| HLRB | Home Location Register of the called subscriber B; |

A GHLR is added in the GSM network and is connected to GMSCA in PLMNA and HLR in PLMNB by signaling. Suppose the rules configured by the operator of PLMNB are: only SRI signaling is permitted for subscriber signaling request; the originating exchange must be in the list of exchanges that conform to the security rules; the subscription record of the called subscriber must be available; only the roaming number in the calling country (where PLMNA is located) is permitted to return.

Figure 5:
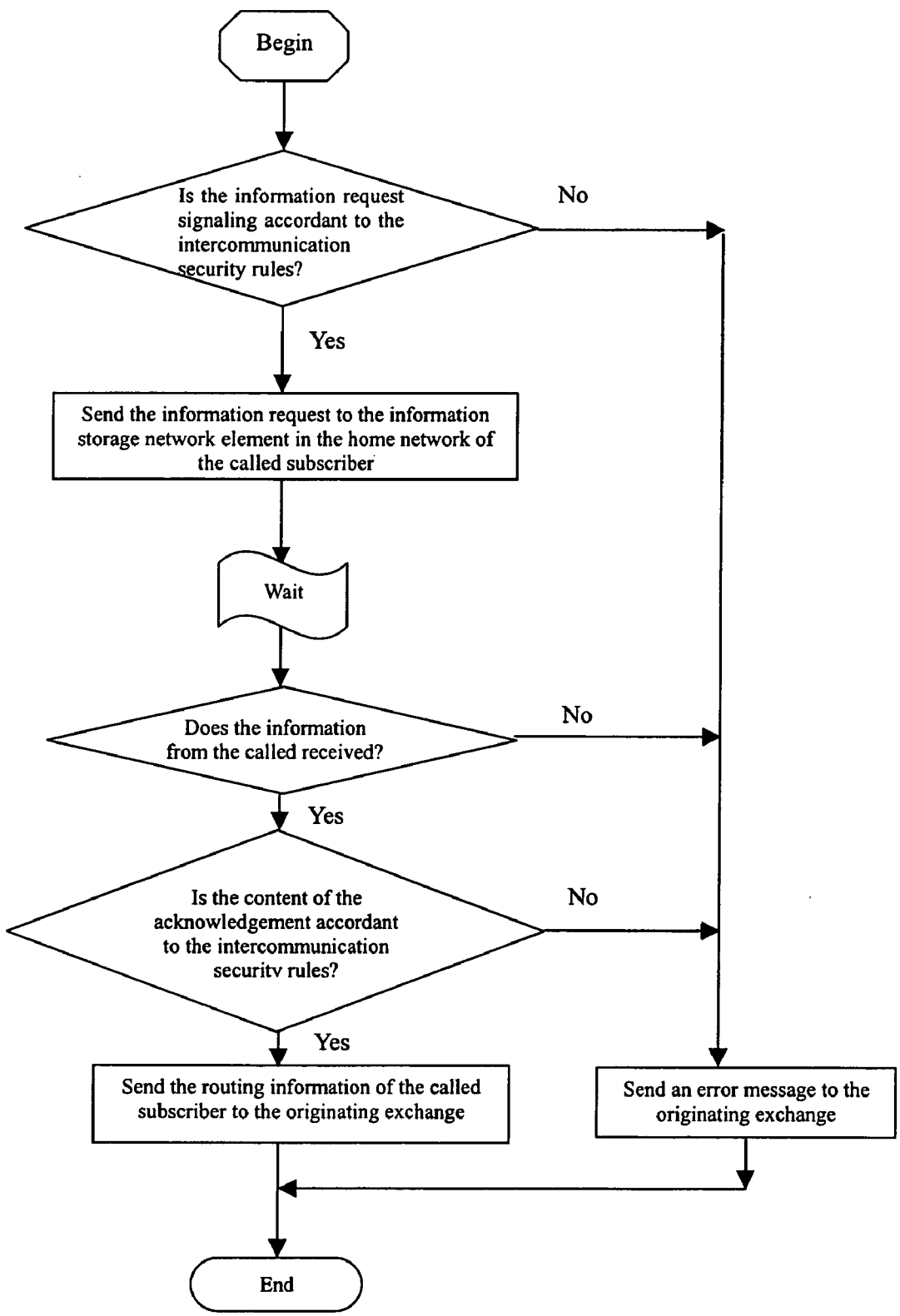
FIG. 5 is a flow chart of GHLR's internal security determination for subscriber information exchange.

FIG. 5 is a flow chart of GHLR's internal security determination for subscriber information exchange in an embodiment of the present invention. As shown in FIG. 5, the flow comprises steps for determining whether the information request signaling is accordant to the intercommunication security rules and whether the content of an acknowledgement is accordant to the intercommunication security rules; the requesting party can obtain the corresponding information only when the two steps are passed successfully.

Figure 6:
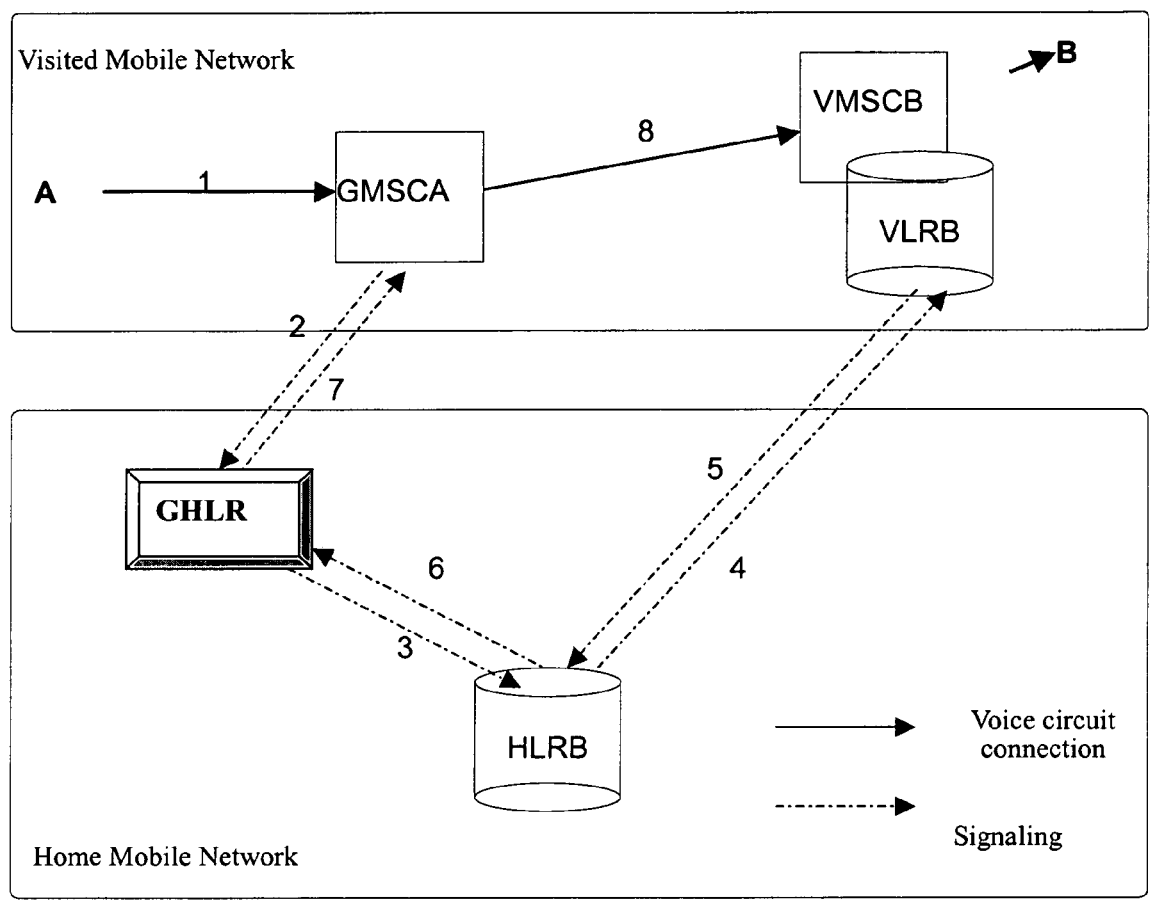
FIG. 6 is a schematic diagram of call switching for a called roaming subscriber when the GHLR controls the routing information exchange.
Figure 7:
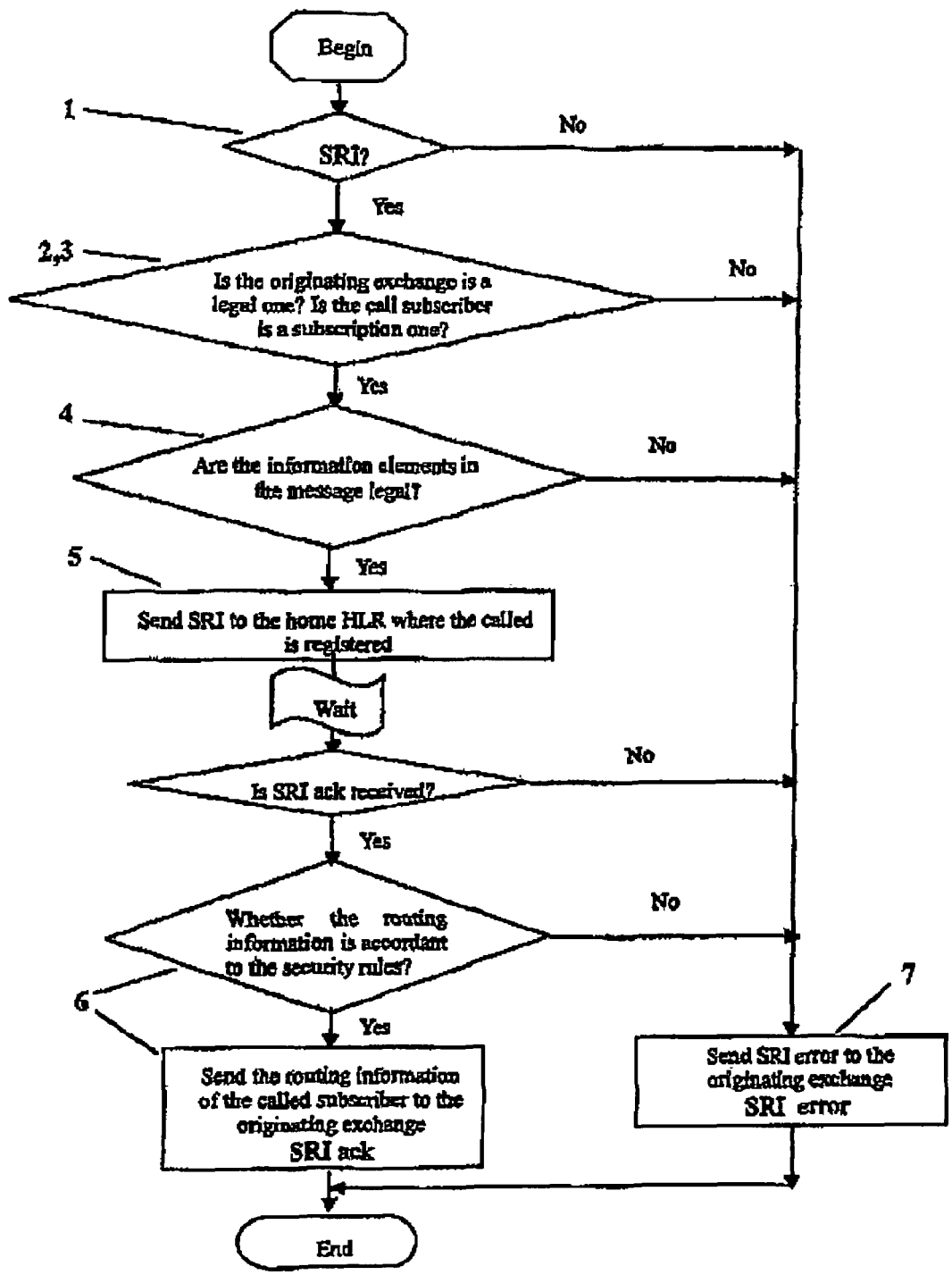
FIG. 7 is a flow chart of GHLR's internal security determination in one embodiment in which the routing information is fetched by the GHLR.

FIG. 6 is a schematic diagram of call switching for a called roaming subscriber when the GHLR controls the routing information exchange; Hereunder the process in FIG. 6 will be described as follows:

Under above conditions, the communication service may comprise the following steps in the concept of the present invention:

1. a subscriber B being roaming in the service area of VLRB in PLMNA; a subscriber A in PLMNA initiating a call to subscriber B, and switching the call to GMSCA;

2. GMSCA sending a SRI to the GHLR in PLMNB to request for routing information;

3. the GHLR determining that the request is accordant to the security rule, and then sending a SRI to HLRB to request for routing information;

4. HLRB interacting with VLRB to obtain a roaming number, and then returning the roaming number to the GHLR;

5. The GHLR determining that the roaming number is a number in the country where PLMNA is located and the roaming number is accordant to the security rule, and then sending a SRI acknowledgement to GMSCA to provide the roaming number;

6. GMSCA switches the call to MSCB according to the roaming number. FIG. 7 is a flow chart of GHLR's internal security determination in one embodiment in which the GHLR fetches the routing information; the GHLR's determination and processing flow is as follows:

1. after receiving a signaling from an external network, GHLR determines whether the signaling is SRI; if not, GHLR will reject the request;

2. if the signaling is SRI, GHLR will determine whether the GMSC address in the signaling is accordant to the security rule; if not, GHLR will reject the request;

3. the GHLR determines whether the called subscriber is a subscription one and whether the subscription content is accordant to the security rule;

4. the GHLR determines whether other information elements in the signaling is accordant to the security rules and whether there is any unacceptable information elements; GHLR may choose to neglect them or reject the request; if "neglect" is chosen, the information elements will be discarded when GHLR initiates a SRI to the HLR in present network;

5. if the security rules are accordant in above determinations, GHLR will initiate a SRI request to HLR;

6. after receiving a SRI acknowledgement, if GHLR finds the fetched number is a roaming number, GHLR will determine whether the number is a number in the country where the calling party is located; if so, GHLR will send the number to the originating exchange; otherwise GHLR will send an error message;

7. after receiving a SRI acknowledgement, which indicates the routing information fetching operation fails, GHLR will send a corresponding error message to the calling exchange, and may choose whether to screen some of the error causes according to the rules configured by the operator and then send the result.

The present invention provides an available method of exchanging roaming subscriber information through controlling roaming subscriber request signaling and an acknowledgement. For example, intercommunication between partial countries, operators, or roaming subscriber in specific time periods may be permitted. It can support route optimization that requires exchange of roaming subscriber information and provide higher quality roaming call services for roaming subscribers at a lower price.

Though the present invention is described with above preferred embodiments, it is understood the protection scope of the present invention is not limited to the embodiments. Any skilled in the art may make variations or replacements within the disclosure in the present invention; however, any such variation or replacement shall be deemed as fall into the protection scope of the present invention. Therefore, the protecting scope should be defined by the claims.

The invention claimed is:

1. A Gateway Home Location Register (GHLR), comprising:
   a signaling transceiving module, connected to a subscriber information storage network element in the home network and a network element capable of fetching subscriber routing information in the visited network, and designed to receive a signaling request and return an acknowledgement, so as to accomplish information exchange between the network element and the GHLR;
   a security rule configuration module, designed to store intercommunication security rules and relevant data of the GHLR system; a routing information security analysis module, designed to receive and store signaling information sent from the signaling transceiving module, to identify and analyze the signaling request according to security rules generated by the security rule configuration module, and to return the acknowledgement to a destination network element via the signaling transceiving module.

2. The GHLR according to claim 1, wherein said intercommunication security rules comprise security rules configured by an operator and security rules selected by subscription of the subscriber.

3. The GHLR according to claim 2, wherein said security rule configuration module comprises:
   a security rule storage module, designed to store the logics of intercommunication security rules of the GHLR system;
   a system intercommunication security rule storage module, designed to store the intercommunication security rule data of the GHLR system;
   a subscriber subscription intercommunication data storage module, designed to store subscriber subscription intercommunication data;
   a subscriber subscription data conversion module, designed to map subscriber data to the system intercommunication security rule data and determining whether the subscriber subscription data is valid according to the system intercommunication security rule data.

4. The GHLR according to claim 3, wherein said GHLR also comprises an input means connected with the security rule storage module and the subscriber subscription intercommunication data storage module, so as to accomplish data input and update.

5. The GHLR according to claim 2, wherein said security rules selected by subscription of the subscriber comprise at least one of serving area restriction, trans-area service restriction and intercommunication information content restriction, or combinations of them.

6. The GHLR according to claim 2, wherein said security rules configured by the operator comprise at least one of whether the called subscriber is a subscription one, whether the calling network element is a legal network element, whether the signaling element is valid, whether the value of the signaling element is valid and whether the service area is valid, or combinations of them.

7. The GHLR according to claim 1, wherein said network element capable of fetching subscriber routing information is a Mobile-services Switching Center (MSC).

8. The GHLR according to claim 1, wherein said network element capable of fetching subscriber routing information is a Service Control Point (SCP).

9. The GHLR according to claim 1, wherein the interface signaling protocol between the signaling transceiving module and the subscriber routing information storage network element is the same as that between the signaling transceiving module and the network element capable of fetching subscriber routing information.

10. A method of exchanging roaming subscriber routing information, comprising the following steps:
   a. a network element capable of fetching subscriber routing information in the visited network sending a routing information request signaling to the GHLR in the home network;
   b. the GHLR receiving the information request and determining the request according to the security rules of the GHLR; if the request is accordant to the intercommunication security rules of the GHLR, going to step c; otherwise the GHLR rejecting the information request;
   c. the GHLR interacting with the HLR in the home network to obtain routing information;
   d. the GHLR determining the received routing information according to the intercommunication security rules; if the routing information is accordant to the intercommunication security rules, going to step e; otherwise the GHLR rejecting the request;
   e. sending the routing information to the network element that sending the request in the visited network.

11. The method of exchanging roaming subscriber routing information according to claim 10, wherein said step b further comprises:
   b11. the signaling transceiving module of the GHLR in the home network, after receiving the routing information request signaling from the visited network, invoking the system intercommunication security rule storage module configured by the operator, and determining whether the request is accordant to the security rules configured by the operator; if so, going to step b12; otherwise rejecting the request;
   b12. invoking the subscriber subscription intercommunication data storage module configured by the subscriber, and determining whether the request is accordant to the security rules configured by the subscriber; if so, going to step c; otherwise rejecting the request.

12. The method of exchanging roaming subscriber routing information according to claim 10, wherein said step b further comprises:

b11. the signaling transceiving module of the GHLR in the home network, after receiving the routing information request signaling from the visited network, invoking the subscriber subscription intercommunication data storage module configured by the subscriber, and determining whether the request is accordant to the security rules configured by the subscriber; if so, going to step b12; otherwise rejecting the request;

b12. invoking the system intercommunication security rule data storage module configured by the operator, and determining whether the request is accordant to the security rules configured by the operator; if so, going to step c; otherwise rejecting the request.

13. The GHLR according to claim 1, wherein the interface signaling protocol between the signaling transceiving module and the subscriber routing information storage network element is different from that between the signaling transceiving module and the network element capable of fetching subscriber routing information.

* * * * *